US012669183B2

(12) United States Patent
Moser et al.

(10) Patent No.: US 12,669,183 B2
(45) Date of Patent: Jun. 30, 2026

(54) LAY FLAT OR POLY HOSE HYDRAULIC SQUEEZE OFF TOOL

(71) Applicant: Jon Scott Moser, Fort Worth, TX (US)

(72) Inventors: Jon Scott Moser, Fort Worth, TX (US); Stephanie Moser, Fort Worth, TX (US)

( * ) Notice: Subject to any disclaimer, the term of this patent is extended or adjusted under 35 U.S.C. 154(b) by 0 days.

(21) Appl. No.: 18/408,783

(22) Filed: Jan. 10, 2024

(65) Prior Publication Data

US 2025/0224040 A1 Jul. 10, 2025

(51) Int. Cl.
*F16K 7/06* (2006.01)
*F15B 20/00* (2006.01)

(52) U.S. Cl.
CPC ............ *F16K 7/068* (2013.01); *F15B 20/004* (2013.01)

(58) Field of Classification Search
CPC ... F16K 7/068; F16K 7/04; F16K 7/07; F15B 20/004
See application file for complete search history.

(56) References Cited

U.S. PATENT DOCUMENTS

| | | | | |
|---|---|---|---|---|
| 3,011,750 A * | 12/1961 | Johnson | | B21D 41/045 72/445 |
| 4,500,071 A * | 2/1985 | Bagwell | | B66F 7/04 254/423 |
| 4,978,100 A * | 12/1990 | Peurifoy | | F16K 7/061 269/127 |
| 5,219,146 A * | 6/1993 | Thompson | | F16K 7/061 74/665 C |
| 5,657,960 A * | 8/1997 | Taylor | | F16K 7/061 251/7 |
| 7,159,838 B2 * | 1/2007 | Champagne | | F16K 7/066 251/7 |
| 8,894,035 B2 * | 11/2014 | Ruelland | | F16K 7/061 251/8 |

* cited by examiner

*Primary Examiner* — Craig M Schneider
*Assistant Examiner* — Andrew J Rost

(57) ABSTRACT

This invention relates to a new and improved hydraulic squeeze tool for compressing and stopping flow through a lay flat or poly hose, such invention engineered to increase the speed and efficiency when cutting flow and fluid transfers in pipe and hose systems in domestic, commercial, or heavy industrial applications.

7 Claims, 8 Drawing Sheets

LAY FLAT OR POLY HOSE HYDRAULIC SQUEEZE OFF TOOL

CROSS-REFERENCE TO RELATED APPLICATIONS

A priority claim is made to an earlier-filed patent Application No. 63/438,707 filed Jan. 12, 2023, entitled "Lay Flat or Poly Hose Hydraulic Squeeze Off Tool".

TECHNICAL FIELD

Hydraulic squeeze tool for compressing and stopping flow through a lay flat or poly hose.

DESCRIPTION OF PRIOR ART

The invention disclosed herein is a hydraulic squeeze tool specifically designed for compressing and halting the flow through a lay flat or poly hose. Unlike prior hydraulic squeeze tools in this field, this invention introduces significant improvements in functionality and safety. Traditional tools in this domain have been limited by their inability to adequately kink the pipe, necessitating multiple operators and posing operational challenges in remote or difficult-to-access locations. Moreover, existing designs, typically featuring a manual thread bolt or a manually operated cylinder capable of squeezing hoses up to 12 inches, require considerable time and effort—often 20-30 minutes—to effectively stop the flow to a designated area. This invention overcomes these limitations with an innovative design that allows for efficient and effective operation, significantly reducing the time and labor required. Additionally, the tool's design enhances safety by minimizing the need for operators to be in close proximity to potentially hazardous shutoff areas. Further details of the design and operation of the hydraulic squeeze tool are illustrated in the accompanying images and diagrams.

SUMMARY OF THE INVENTION

The invention disclosed herein pertains to a hydraulic squeeze tool designed to enhance the efficiency and speed in managing fluid flow within pipe and hose systems. This tool is applicable across various settings, including residential, commercial, and heavy industrial environments. The tool is engineered for use with pipe and hose systems of up to 16 inches in diameter. It allows operators to remotely control the shut-off area, rapidly halting fluid flow in the targeted zone. This feature negates the necessity for heavy machinery during transfers across platforms.

In a specific embodiment, the invention employs manual or CNC (Computer Numerical Control) lathes, mills, and other conventional devices to modulate or halt fluid flow in collapsible conduits. It is designed to control the flow of fluids—whether pressurized or not—in any collapsible material ranging from ⅜ inches to 16 inches in diameter. This ability enables operators to manage fluid flow without resorting to shut-off valves for various maintenance activities, such as splicing, directional tee insertion, or leak repair.

The utility of this invention is particularly significant in scenarios requiring prolonged repair or modification periods of fluid transfer systems. Such scenarios may include situations with inaccessible shut-off valves, challenging terrain, or the need to re-prime systems. This invention notably reduces the labor required to interrupt flow in lay-flat or poly pipes, as further illustrated in the accompanying drawings.

The hydraulic squeeze tool employs high-pressure cylinders to apply a controlled, U- or V-shaped compression to pipes or hoses, effectively restricting or ceasing flow in systems up to 16 inches in diameter.

Regarding FIG. 1, the invention is shown in a fully closed state without any lay-flat pipe between the upper member (7) and lower member (8) as known together as compression arms or squeeze arms. A stabilization bar (1) connects to each hydraulic cylinder (2), which is securely attached to the upper member (7). FIG. 8 illustrates an innovative design of the upper member (7) featuring a V- or U-shaped protrusion compatible with a corresponding depression in the lower member (8). This configuration allows for more efficient constriction of a lay-flat pipe when the members are engaged, as depicted in FIG. 7. The hydraulic fluid is channeled through hoses quick connector ports (4) and (5) for pump(s), with the flow being reversible for priming and a flow diverter box (6) that sends equal amounts of oil to each cylinder (2) so they both extend and retract at the same time. Check valves (3A) are included to hold oil in each cylinder (2) in the event one of the hydraulic hoses (3) breaks. An optional securing means (10), when attached to the upper member (7) through attaching means (20), facilitates additional stabilization of the device using standard bolts or other connectors such as straps (22) and locking mechanism (18) to secure said straps. This securing means (10) enhances operational control but is not essential for the tool's functionality.

An additional safety flow divider check valve gauge (6) is attached to upper member (7) and if the hydraulic lines connected through hose connector ports (4) and (5) fail the system will keep hydraulics (2) charged and pressurized such that upper member (7) and lower member (8) remain operatively connected and flow restricted in any lay flat pipe between same.

This disclosure contemplates various modifications and alternative embodiments. The specific terms used herein serve solely for descriptive purposes and should not be construed as limiting the scope of the invention. The scope of the invention is defined not by the specific embodiments illustrated but by the appended claims.

OBJECTS OF THE INVENTION

The present invention aims to facilitate the transfer of heavy equipment between platforms in a safe manner, thereby eliminating the need for conventional heavy lifting equipment.

A further objective of the invention is to provide a method for controlling or halting fluid flow in pipes, such as during splicing, insertion of directional tees, or leak repairs, without the necessity of using a shut-off valve.

Another goal of the invention is to minimize the labor required to interrupt fluid flow in lay flat or poly pipes, streamlining the process and reducing manpower.

Additionally, the invention is designed to enable the disruption of fluid flow in lay flat or poly pipes for extended periods, facilitating repair or modification work on the fluid transfer system without continuous manual intervention.

3

Figure 1:
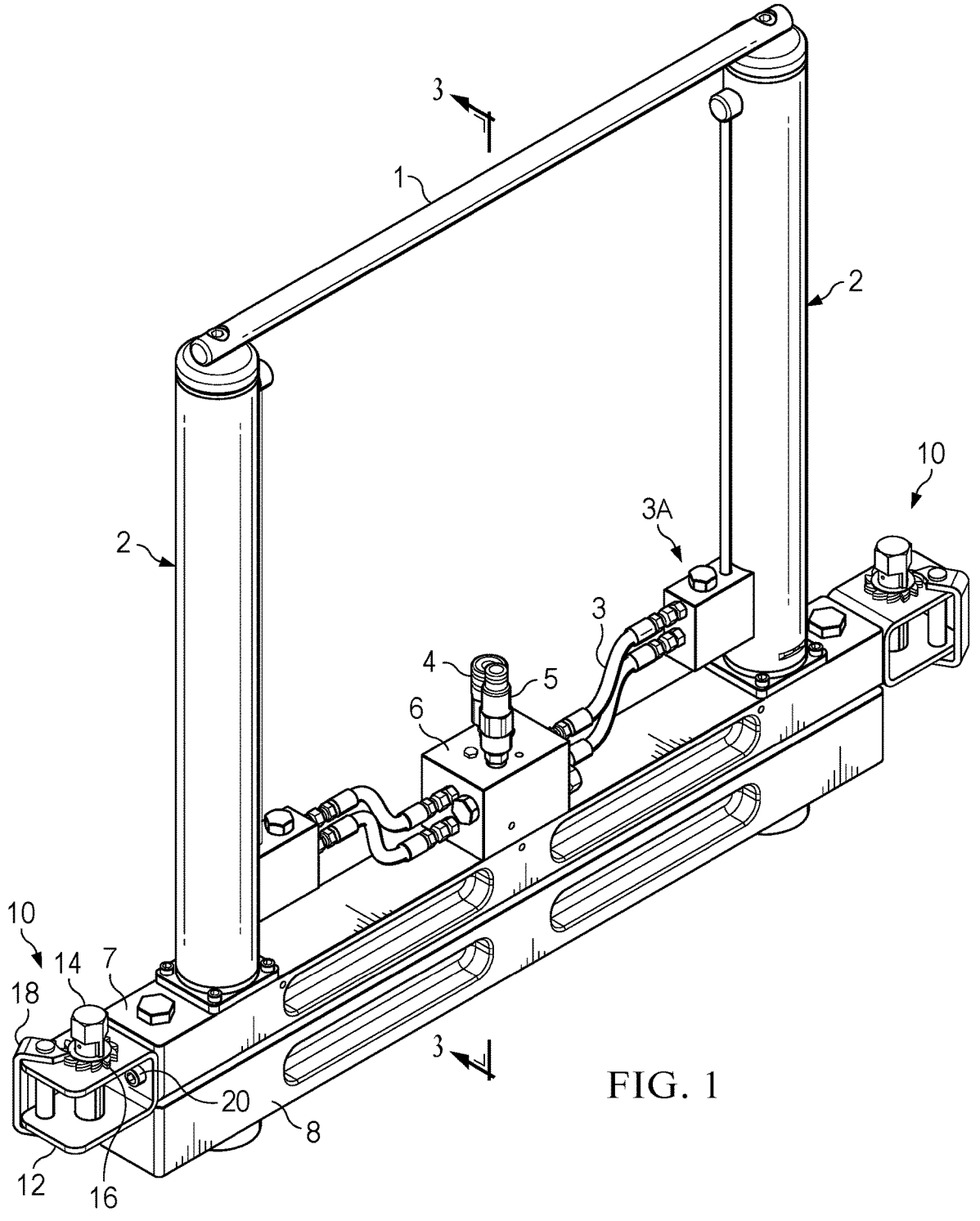
FIG. 1: Describes a front view of the squeeze tool in a fully compressed position, including a specific component (flow divider check valve gauge (6) and safety optional safety securing means (10)).
Figure 2:
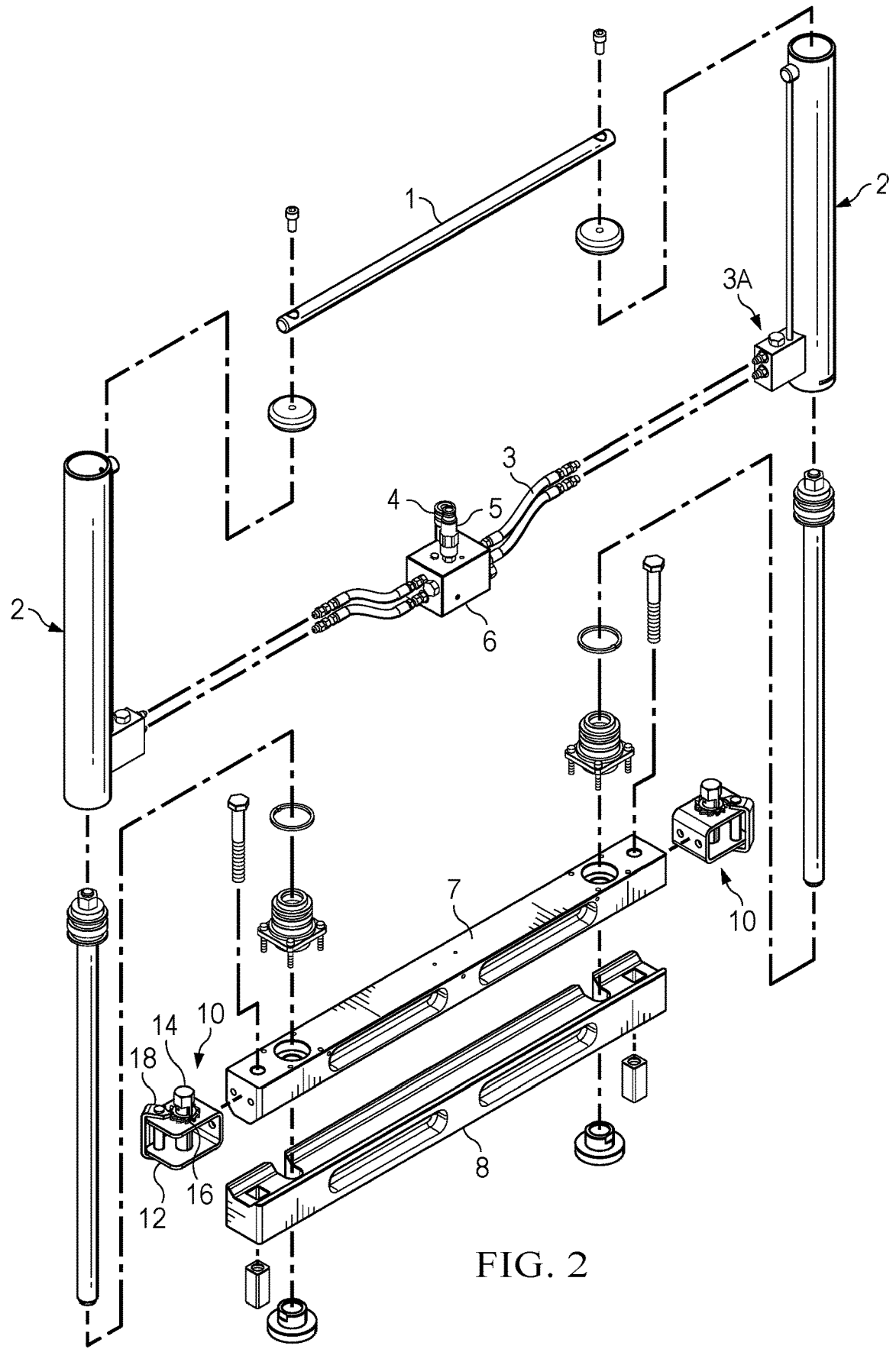

FIG. 2: Offers an exploded view of the squeeze tool for construction purposes.

Figure 3:
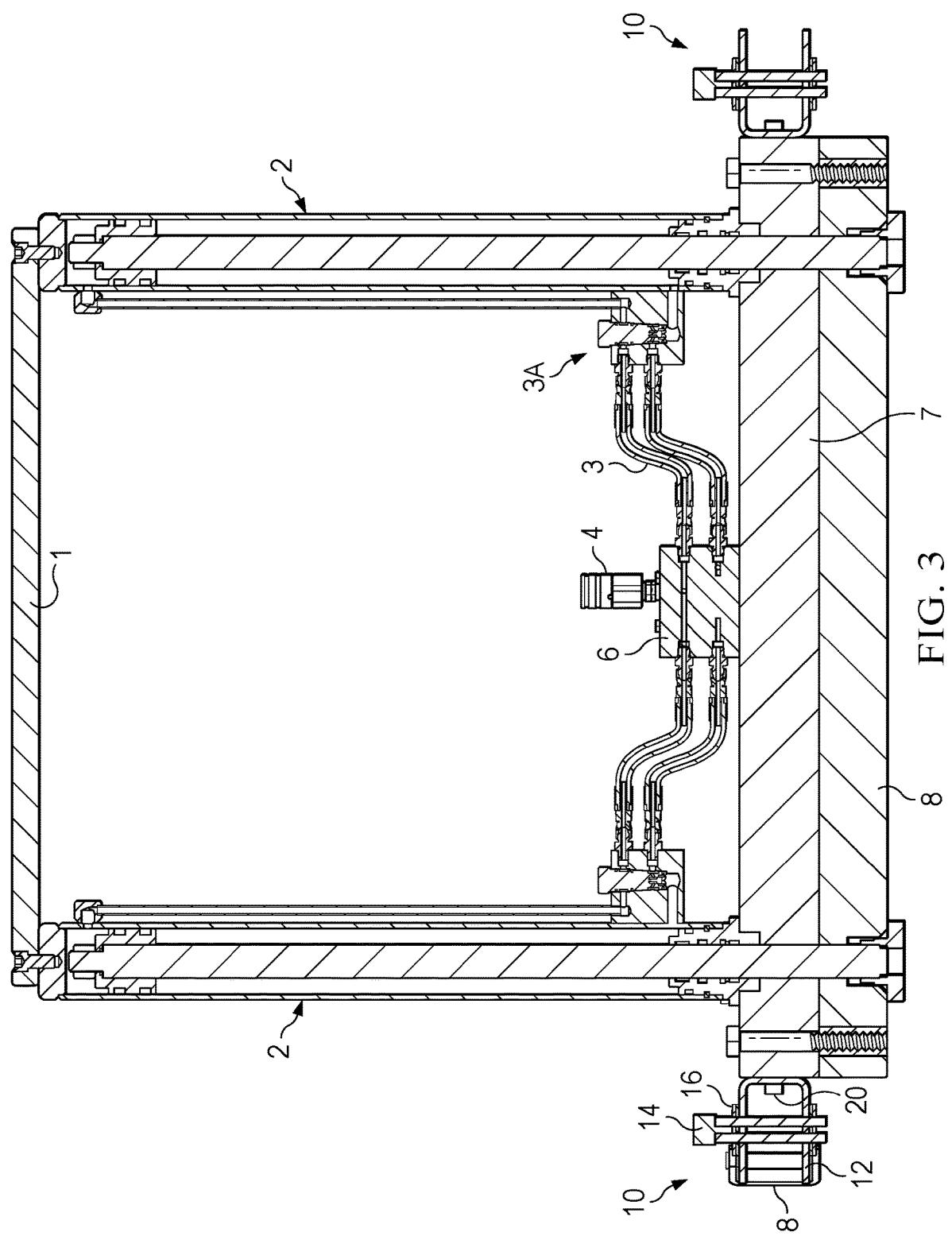

FIG. 3: Describes a closed cross-sectional view of the squeeze tool as constructed.

Figure 4:
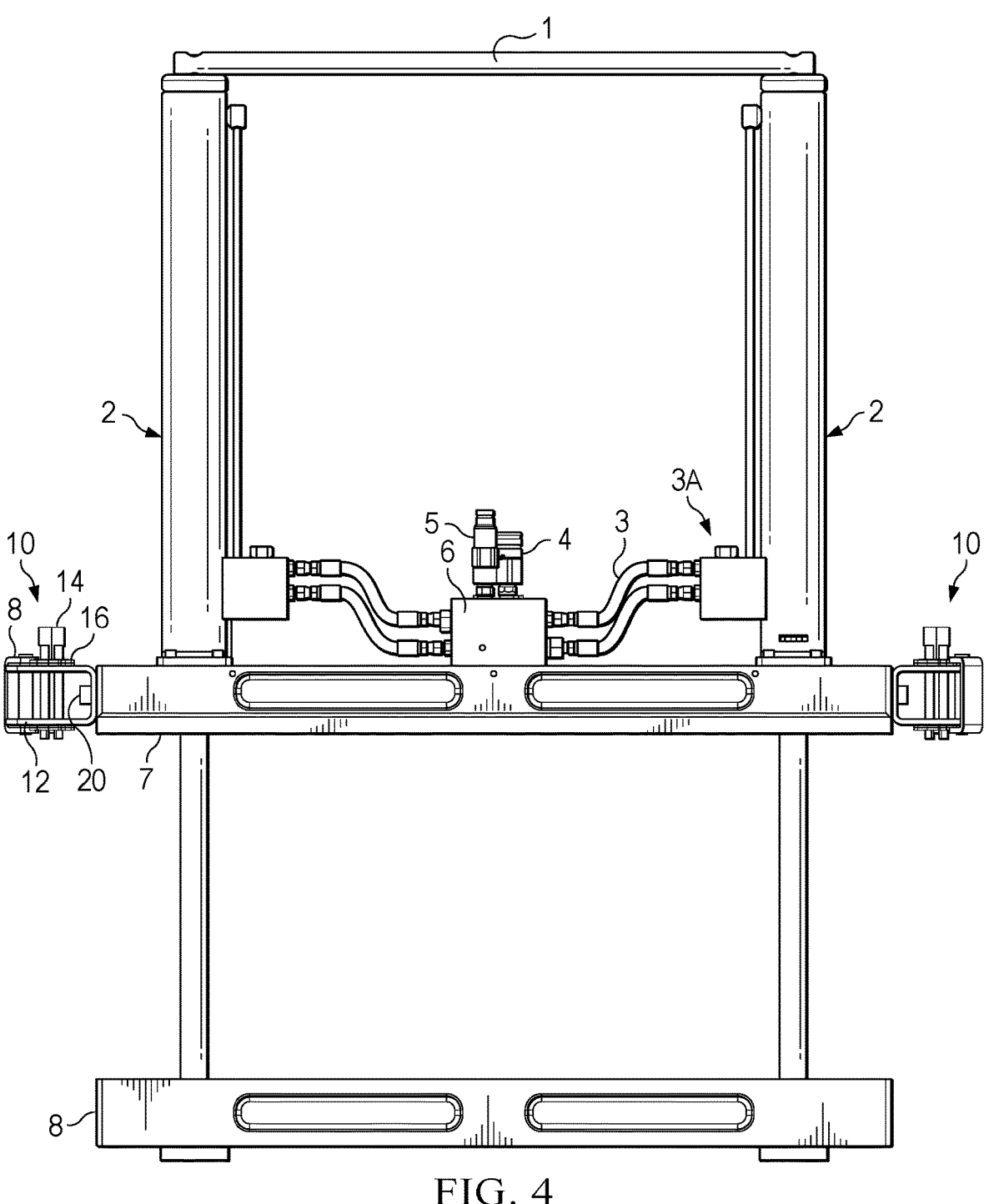

FIG. 4: Offers an open front view of the squeeze tool.

Figure 5:
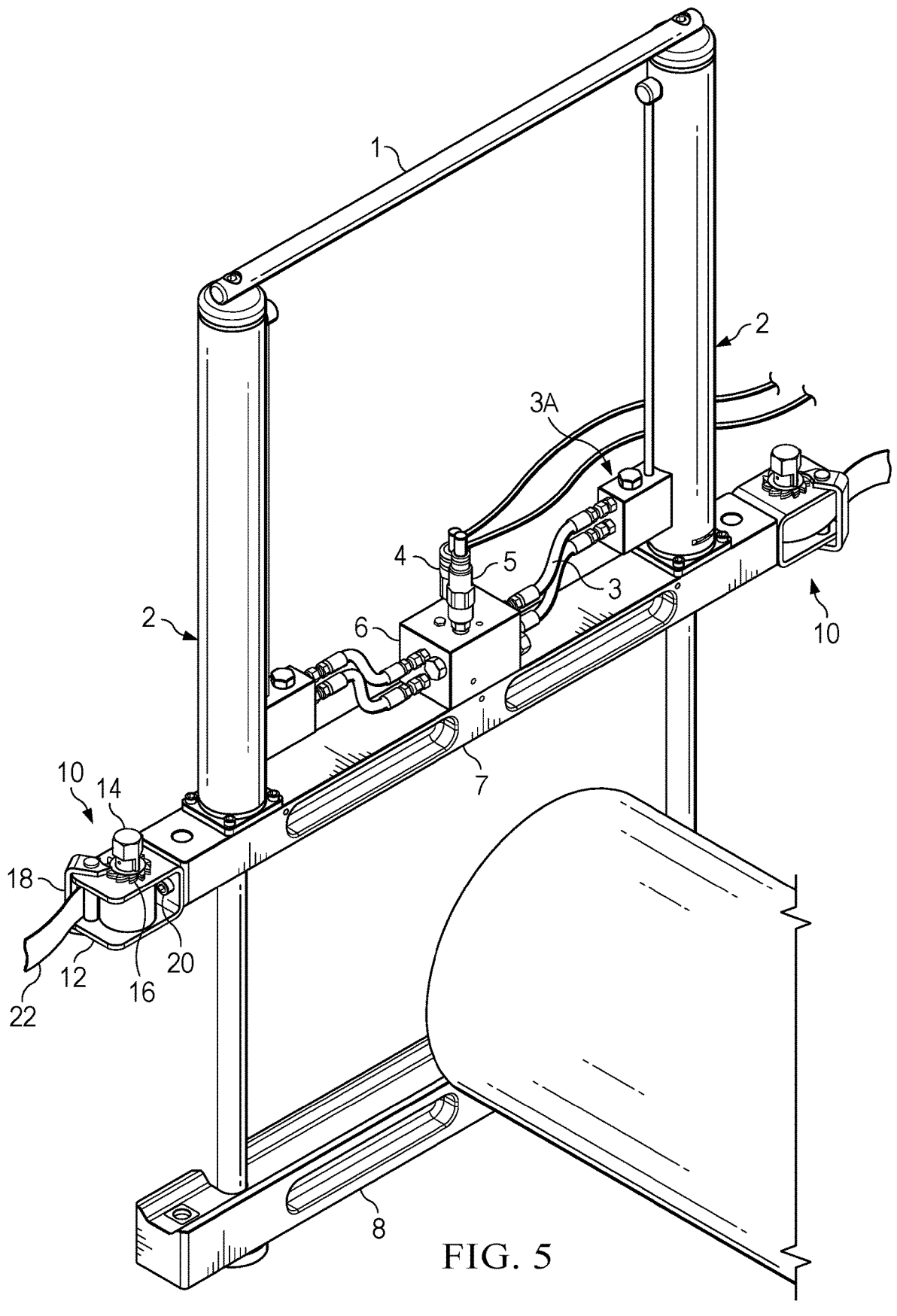

FIG. 5: Provides a side view of the squeeze tool with optional safety securing means (10), a lay flat pipe inserted through the upper member (7) and lower member (8) prior to compression.

Figure 6:
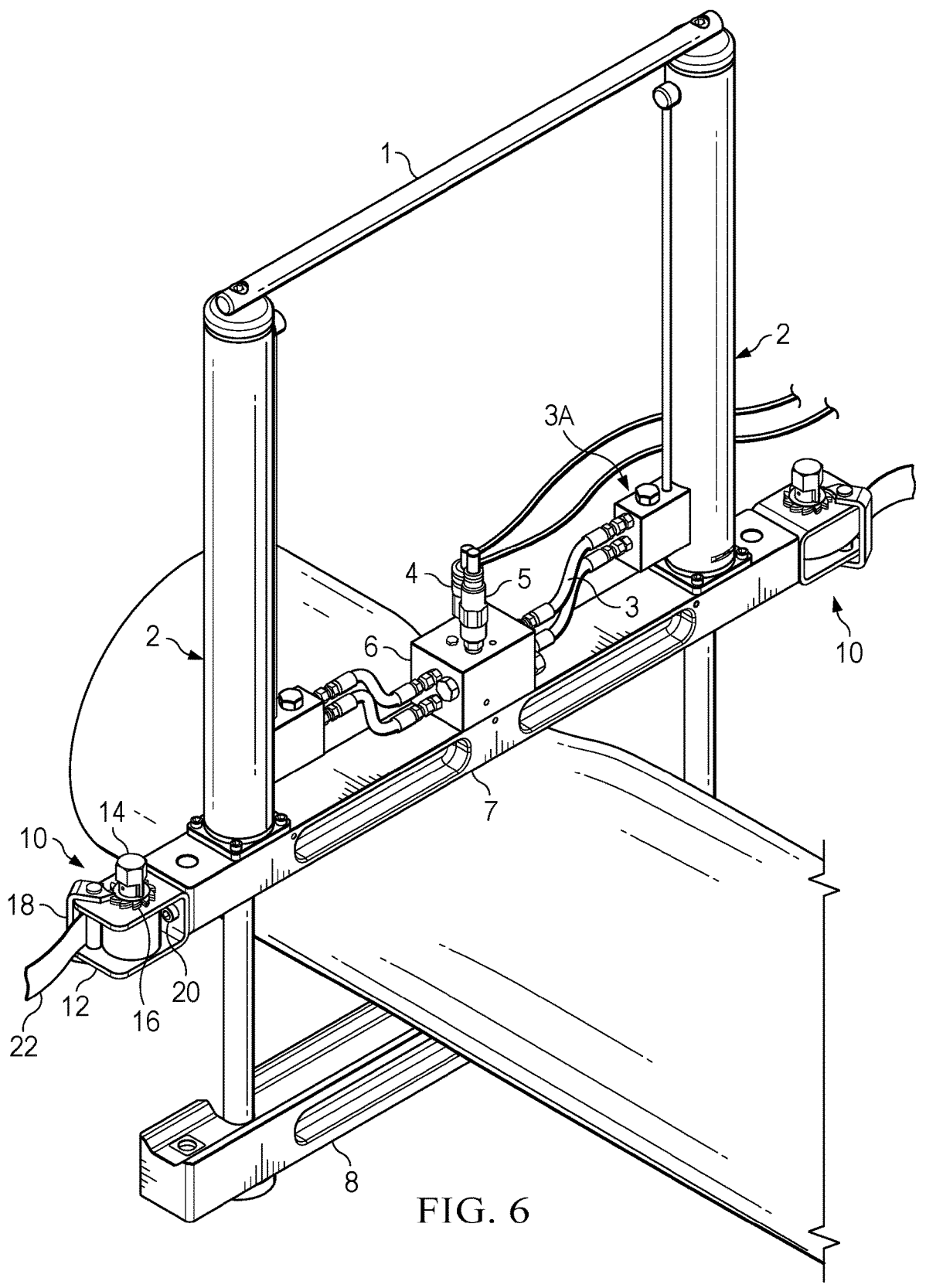

FIG. 6: Shows a side view of the squeeze tool with optional safety securing means (10), a lay flat pipe inserted through the upper member (7) and lower member (8) at the commencement of compression.

Figure 7:
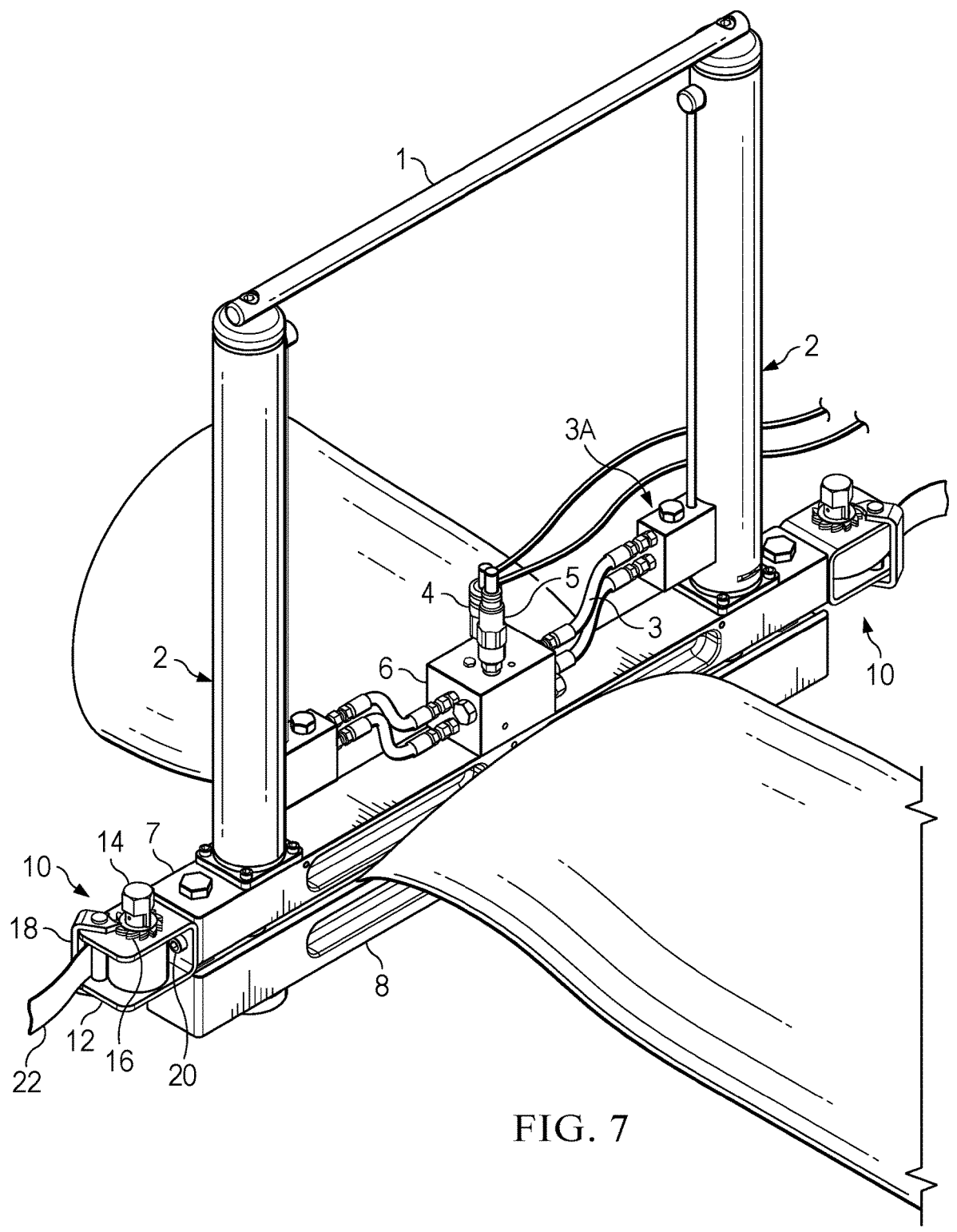

FIG. 7: Provides a side view of the squeeze tool with optional safety securing means (10), a lay flat pipe inserted through the upper member (7) and lower member (8) at full compression.

Figure 8:
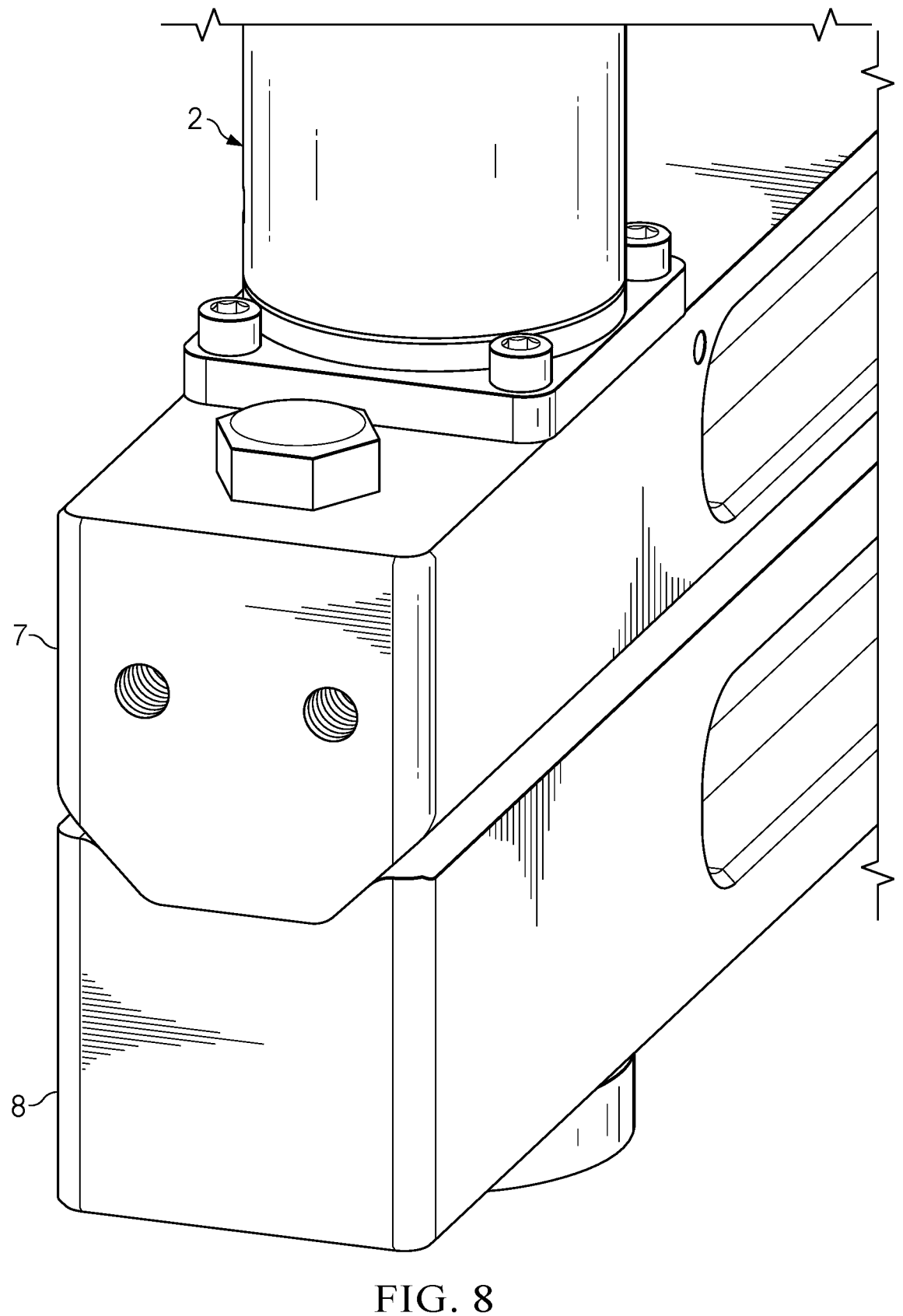

FIG. 8: Illustrates a side view of the squeeze tool without optional safety securing means (10) with the upper member (7) featuring a V- or U-shaped protrusion compressed within the corresponding depression in lower member (8).

What is claimed:

1. A hydraulic squeeze tool for managing fluid flow in pipe and hose systems, the tool comprising:
   - a pair of compression arms designed to apply U- or V-shaped compression to pipes or hoses;
   - high-pressure hydraulic cylinders connected to each of the compression arms;
   - a stabilization bar connecting the hydraulic cylinders;
   - hose connector ports for channeling hydraulic fluid to the hydraulic cylinders; and
   - a safety flow divider check valve gauge attached to said compression arms; wherein the safety flow divider check valve gauge is a flow diverter box configured to distribute equal amounts of hydraulic fluid to each of the hydraulic cylinders so that the hydraulic cylinders extend and retract simultaneously, the safety flow divider check valve gauge further including check valves associated with each hydraulic cylinder to maintain hydraulic pressure in the event of a hydraulic hose failure and to keep the hydraulic cylinders charged and pressurized if hydraulic lines fail, thereby maintaining the compression arms in an operative position; and
   - wherein the hydraulic squeeze tool is operable to restrict or cease fluid flow in pipe and hose systems up to 16 inches in diameter.

2. The hydraulic squeeze tool of claim 1, wherein the compression arms include an upper member and a lower member, the upper member having a V- or U-shaped protrusion and the lower member having a corresponding depression, such that engagement of the compression arms constricts a lay-flat pipe positioned therebetween.

3. The hydraulic squeeze tool of claim 2, wherein the upper member is adapted to connect to an optional securing means device for additional stabilization during operation.

4. The hydraulic squeeze tool of claim 3, wherein the optional securing means device includes standard bolts or straps with a locking mechanism.

5. The hydraulic squeeze tool of claim 1, wherein the tool is engineered to control fluid flow in collapsible conduits ranging from ⅜ inches to 16 inches in diameter.

6. The hydraulic squeeze tool of claim 1, wherein the tool allows operators to remotely control the shut-off area in the pipe and hose systems.

7. A method for managing fluid flow in pipe and hose systems using the hydraulic squeeze tool of claim 1, the method comprising the steps of:
   - positioning a lay-flat or poly pipe between the compression arms of the tool;
   - activating the hydraulic cylinders to apply controlled compression to the pipe;
   - constricting the flow of fluid in the pipe; and
   - utilizing the safety flow divider check valve gauge to maintain the compression arms in an operative position in case of hydraulic line failure.

* * * * *